Figure 3:
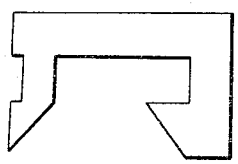

(No Model.) 2 Sheets—Sheet 1.
A. B. BLACKBURN & W. BUCHANAN.
DYNAMO ELECTRIC MACHINE.
No. 551,712. Patented Dec. 17, 1895.
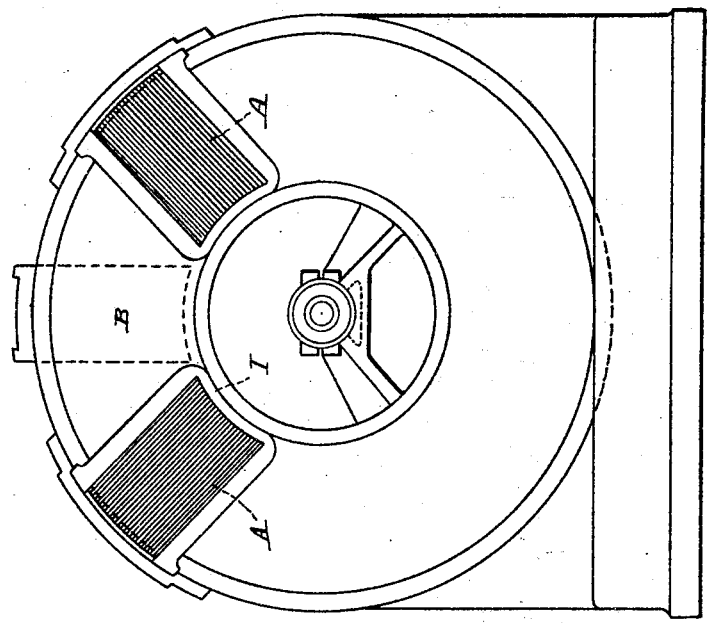
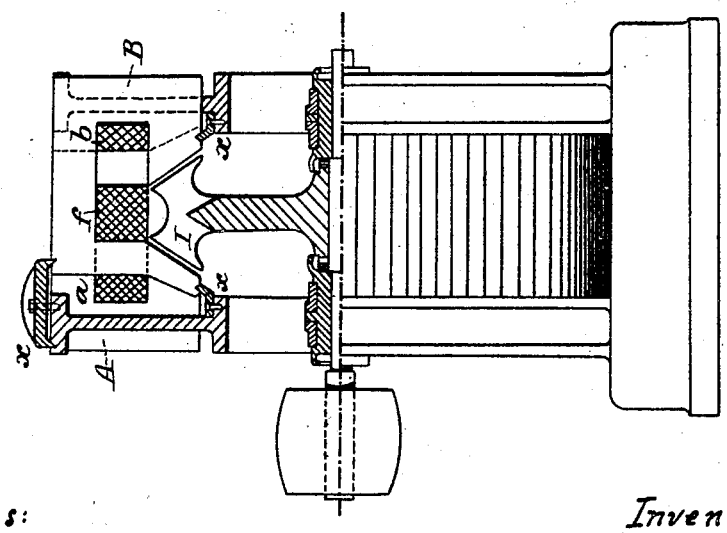
Witnesses:
E. J. Griswold
L. Wenke
Inventors:
Alexander B. Blackburn
and William Buchanan
By their Attorneys
Howson and Howson (No Model.) 2 Sheets—Sheet 2.

A. B. BLACKBURN & W. BUCHANAN.
DYNAMO ELECTRIC MACHINE.

No. 551,712. Patented Dec. 17, 1895.

Witnesses
E. J. Griswold
L. Wenke

Inventors:
Alexander B. Blackburn
and William Buchanan
By their attorneys
Howson and Howson

UNITED STATES PATENT OFFICE.

ALEXANDER B. BLACKBURN AND WILLIAM BUCHANAN, OF WOLVERHAMPTON, ENGLAND.

DYNAMO-ELECTRIC MACHINE.

SPECIFICATION forming part of Letters Patent No. 551,712, dated December 17, 1895.

Application filed October 1, 1895. Serial No. 564,296. (No model.)

*To all whom it may concern:*

Be it known that we, ALEXANDER BEWICKE BLACKBURN, civil engineer, and WILLIAM BUCHANAN, electrical engineer, subjects of the Queen of Great Britain and Ireland, residing at Bushbury Works, Wolverhampton, in the county of Stafford, England, have invented certain Improvements in Dynamo-Electric Machines, of which the following is a specification.

According to this invention we employ coils in which alternating currents are produced, and which constitute the armature-coils, and a coil through which a continuous or rectified current is passed, and which constitutes the exciting-coil. We also employ sets of laminations or plates, shaped so that those of one set embrace the exciting-coil and one of the armature-coils, and those of the next set embrace the exciting-coil and the other of the armature-coils, and so on alternately. These laminations or plates constitute one portion of the magnetic circuit which is completed by a moving portion, constituting the inductor portion, consisting of projecting portions of a width preferably about equal to the distance between the mid-lines of adjacent sets of laminations or plates. The said inductor portion is caused to revolve in any convenient way—such, for example, as by being fixed to a wheel driven by a shaft. The projections of the inductor portion as they pass the several sets of laminations or plates complete the magnetic circuit around the exciting-coil and alternately the one and the other of the armature-coils, the number of lines of magnetic force through the armature-coils being at a maximum when the projections of the inductor portion pass them, the magnetic force diminishing as it leaves them and increasing in the next set, and so on, and as the sets of laminations or plates are equal, it follows that there is always the same, or about the same, number of lines of magnetic force passing through the inductor portion, and as these are always in the same direction there can be no change of induction through the exciting-coil.

It will be seen that alternating currents of equal period and (when the number of turns in the armature-coils are the same) of equal electromotive force but opposite phase will be generated in the armature-coils.

Instead of two armature-coils and two series of sets of laminations or plates there may be a greater number of each—say three or four—arranged so that as the inductor portion revolves it closes the magnetic circuit successively around each of the several armature-coils and the exciting-coil at equal time intervals, so that alternating currents differing in phase in accordance with the number of armature-coils and series of sets of laminations or plates will be generated in the armature-coils.

The exciting-coil may be attached to and revolve with the inductor portion, or instead the armature-coils and the sets of laminations or plates can be made to revolve while the other parts remain stationary.

By means of a rectifier or commutator the machine can be used to give continuous currents.

To enable the invention and the manner in which it may be performed to be readily understood, the annexed drawings are given, in which—

Figure 4:
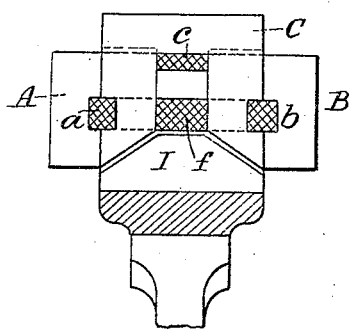
Figure 5:
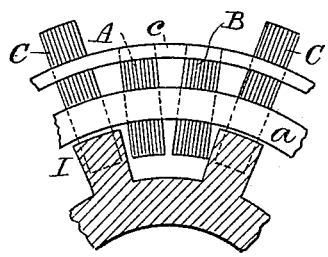
Figure 6:
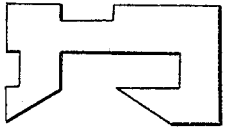
Figure 7:
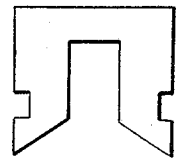

Figures 1 and 2 are a section and a side elevation of a dynamo for generating single-phase currents. Fig. 3 shows, separately, the form of the plates, laminations, or stampings A B. Figs. 4 and 5 are sections, at right angles to each other, of part of a dynamo, showing a modified arrangement for three-phase currents. Fig. 6 shows the form of the plates, laminations, or stampings A B; and Fig. 7 shows the form of the plates, laminations, or stampings C.

I is the moving portion of the magnetic circuit constituting the inductor. It is caused to revolve by being part of or attached to a wheel fixed on a shaft, which may be driven in the usual way.

*a b* are the armature-coils, in which alternating currents are produced, and *f* is the exciting-coil, through which a continuous or rectified current is passed.

A B are laminations, plates, or stampings of magnetic metal, forming, with the inductor I, the magnetic circuit by being arranged around the coils, as hereinbefore described and as clearly shown in the drawings. Each set is held in place by clamps, as at $x$.

When the inductor I is in the position in which it completes the magnetic circuit around the coils $f$ and $a$, the number of lines through the coil $a$ is at a maximum. As the inductor I passes from the parts of the coil $a$, surrounded by the magnetic laminations, plates, or stampings A, to the parts of the coil $b$, surrounded by the magnetic laminations, plates, or stampings B, the number of lines through the coil $a$ diminishes, while the number through the coil $b$ increases at the same rate, and, as the reluctances of the circuits A and B are equal, it follows that there is always the same number of lines passing through the inductor I, and as these are always in the same direction there can be no change of induction through the exciting-coil $f$.

It will be seen that alternating currents of equal periodicity and (when the number of turns in the coils $a$ and $b$ are the same) of equal electromotive force but opposite phase will be generated in the coils $a$ and $b$.

Figs. 4 and 5 show an arrangement suitable for generating three-phase currents, in which arrangement three armature-coils $a\ b\ c$ are formed into separate magnetic circuits by the plates A B C. As the inductor I revolves it closes the circuits A B C consecutively and at equal time intervals, so that alternating currents differing in phase by one-third of a period will be generated in the coils $a$, $b$, and $c$; but, as before, there is no change of induction in the coil $f$. By employing four armature-coils and four magnetic circuits currents differing in phase by one-quarter period can be generated in a similar manner.

In carrying out this design the exciting-coil $f$ need not be fixed, but can be attached to the moving part I, or this can be fixed and the armature-coils with the laminations, plates, or stampings of magnetic material be revolved.

As before stated, by means of a suitable rectifier or commutator the machine can be used to give continuous currents, and by suitably proportioning the relative number of turns in the field-magnet and the armature-coils the machine can be made to give either a constant current or constant potential at the terminals.

Having now particularly described and ascertained the nature of our said invention and in what manner the same is to be performed, we declare that what we claim is—

1. A dynamo electric machine in which an exciting coil is combined with two or more armature coils, and sets of laminated magnetic material, some embracing one armature coil and some another, and an inductor having projections to close the magnetic circuits successively whereby there is little or no fluctuation in the number of lines through the exciting coil, substantially as described.

2. A dynamo electric machine in which an exciting coil is combined with two or more armature coils, two alternating sets of laminated magnetic material, one set embracing one armature coil and the exciting coil, and the other set embracing the other armature coil and the exciting coil, and an inductor adapted to close the magnetic circuits successively, substantially as described.

In testimony whereof we have signed our names to this specification in the presence of two subscribing witnesses.

A. B. BLACKBURN.
W. BUCHANAN.

Witnesses:
EDWARD POOLE,
GEORGE HOLMES.